J. C. FRENCH.
Improvement in Vault Lights.
No. 123,688.  Patented Feb. 13, 1872.
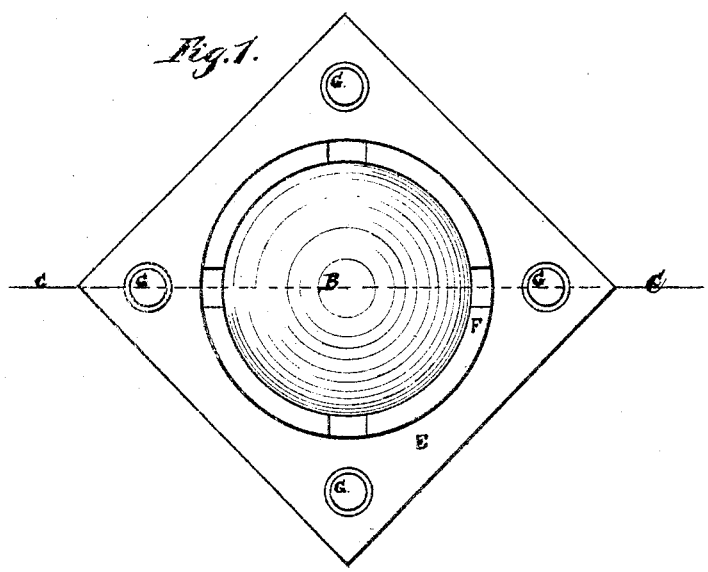
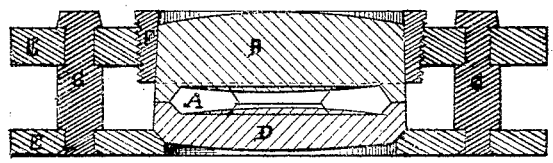

123,688

UNITED STATES PATENT OFFICE.

JAMES C. FRENCH, OF CHICAGO, ILLINOIS.

IMPROVEMENT IN VAULT-LIGHTS.

Specification forming part of Letters Patent No. 123,688, dated February 13, 1872.

SPECIFICATION.

I, JAMES C. FRENCH, of Chicago, in the county of Cook and State of Illinois, have invented a certain Improvement in Vault-Lights, for lighting basements, areas, vaults, &c., of which the following is a specification:

*Nature and Objects of the Invention.*

This invention relates to the construction of the glass lenses or disks in such a manner as to prevent the sweating (as it is called) or condensation of the moisture in the air upon the under side of the glass; also to regulate the quantity or color of the light.

*Description of the Accompanying Drawing.*

Figure 1 is a top or isometrical view of a plate embodying my invention. Fig. 2 is a section of the same through C C.

*General Description.*

E E are metallic plates, into which the disks or lenses are set. G G G G are rivets or studs that confine the plates together. F is a metallic ring that holds the glass disks or lenses in position. B and D are glass disks or lenses. B, the upper lens, is made with ledges or projections on the bottom side and outer edge that rests upon D, leaving an air space, A, between the lenses. D is constructed with projections upon its upper side and outer edge, corresponding with and meeting projections on B, and doubling the size of the air space. This air space serves to equalize the temperature of the disks or lenses with the air, and prevent the condensation of moisture upon the bottom of the lenses.

By placing thin colored paper or other material between the lenses or disks B and D, when they are set in the plates the light can be graduated or colored, as may be desired.

*Claim.*

I claim as my invention—

1. The combination of the lenses B and D with the metallic plates E E, substantially as and for the purpose hereinbefore set forth.

2. The combination of the lenses B and D, substantially as described, and for the purpose hereinbefore set forth.

JAMES C. FRENCH.

Witnesses:
RICHARD R. FRENCH,
FONTAINE McCULLAM.